United States Patent Office 2,776,959
Patented Jan. 8, 1957

2,776,959

ACID MONOAZO DYESTUFFS

Franz Frisch, Arlesheim, near Basel, Switzerland, assignor to Sandoz A. G., Basel, Switzerland, a Swiss firm No Drawing. Application October 26, 1954,
Serial No. 464,890

Claims priority, application Switzerland October 30, 1953

6 Claims. (Cl. 260—162)

The present invention relates to new acid monoazo dyestuffs which correspond to the formula

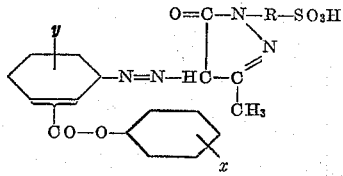

wherein $x$ stands for an alkyl group containing at least 4 and at most 12 carbon atoms, or for a cyclohexyl, benzyl or phenyl group, $y$ stands for hydrogen or a chlorine atom and —R—SO₃H stands for the radical of an aromatic sulfonic acid of the benzene or naphthalene series.

The new acid monoazo dyestuffs of the present invention are obtained by coupling one mol of a 1-aminobenzene-2 or -3-carboxylic acid ester which corresponds to the formula

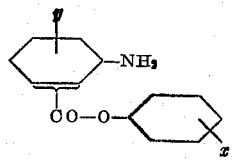

wherein $x$ and $y$ have the above recited significances, with one mol of a 1-aryl-3-methyl-5-pyrazolone-sulfonic acid corresponding to the formula

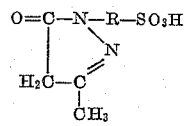

wherein —R—SO₃H has the significance recited above.

Of the 1-aminobenzene-2 or -3-carboxylic acid esters used, according to the invention, for making the new dyestuffs, those are particularly advantageous wherein $x$ is butyl, amyl, hexyl, octyl, cyclohexyl, benzyl or phenyl. Preferred positions for substituent $x$ are the para and ortho positions relative to the oxygen atom.

The 1-aryl-3-methyl-5-pyrazolone-sulfonic acids to be employed according to the present invention comprise the 1-phenyl- and 1-naphthyl-3-methyl-5-pyrazolone-sulfonic acids. The sulfonic acid group in these compounds is, according to the invention, in the phenyl or naphthyl nucleus. In addition to the sulfonic acid group, the said phenyl or naphthyl nucleus may also carry further substituents, such for example as halogen atoms (e. g. chlorine), alkyl groups (e. g. methyl), alkoxy groups (e. g. methoxy, ethoxy) and alkylsulfonyl groups (e. g. methylsulfonyl).

In carrying out the process for the preparation of the dyestuffs of the present invention, the 1-aminobenzene-2- or -3-carboxylic acid ester (b) is advantageously dissolved in the necessary quantity of concentrated acetic acid and hydrochloric acid, and is then diazotized by means of an approximately 20% aqueous sodium nitrite solution. The resultant clear diazo solution is combined, preferably in the presence of excess sodium acetate and at 10–20° C., with an aqueous solution of the 1-aryl-3-methyl-5-pyrazolone-sulfonic acid (c). The acid monoazo dyestuff which separates out on completion of the coupling is filtered off and dried.

The new acid monoazo dyestuffs are yellow powders which dissolve with yellow coloration in hot water. They dye wool, silk and synthetic nitrogen-containing fibers, such for example as synthetic polyamide fibers (nylon, Perlon), from a neutral to weakly acid bath in greenish yellow to yellow shades which are distinguished by very good fastness to light, to washing, to perspiration and to alkaline fulling.

The following examples represent typical embodiments of the invention. In such examples, the parts and percentages are by weight, and the temperatures are in degrees centigrade.

Example 1

32.5 parts of 1-amino-3-carbo-(4'-normal octyl)-phenoxybenzene are dissolved in 60 parts of concentrated acetic acid. 30 parts of concentrated hydrochloric acid are then added to the solution in the cold, followed by a 20% aqueous solution of 7 parts of sodium nitrite at 0–5°. The resultant clear yellowish diazo solution is run at 5–10° into a solution of 32.3 parts of 1-(2',5'-dichloro)-phenyl-3-methyl-5-pyrazolone-4'-sulfonic acid in 500 parts of water and 35 parts of sodium acetate. Upon completion of the coupling, the precipitated monoazo dyestuff of formula

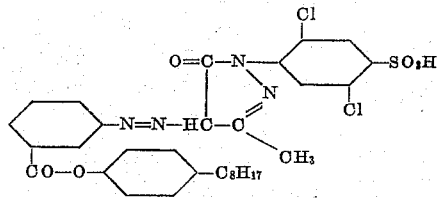

is filtered off and dried. It is a yellow powder which dissolves with a pure yellow coloration in hot water and dyes wool, silk and synthetic polyamide fibers from a neutral to weakly acetic acid bath in pure greenish yellow shades of very good fastness to light, to washing, to perspiration and to fulling.

Example 2

28.3 parts of 1-amino-3-carbo-(4'-tert.amyl)-phenoxybenzene are diazotized after the manner set forth in Example 1. The resultant clear diazo solution is combined at 5–10° with the solution of 28.9 parts of 1-(2'-chloro)-phenyl-3-methyl-5-pyrazolone-5'-sulfonic acid in 500 parts of water and 35 parts of sodium acetate. Upon completion of the coupling, the precipitated yellow monoazo dyestuff of formula

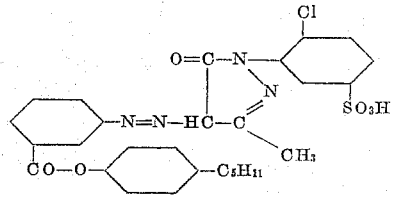

is filtered off and dried. Its properties are very similar to those of the product obtained according to Example 1.

Example 3

28.3 parts of 1-amino-3-carbo-(4'-tert.amyl)-phenoxybenzene are diazotized after the manner set forth in Example 1. The resultant clear diazo solution is added dropwise, at 5–10°, to the solution of 32.3 parts of 1-(2',5'-dichloro)-phenyl-3-methyl-5-pyrazolone-4'-sulfonic acid in 600 parts of water and 35 parts of sodium acetate. Upon completion of the coupling, the precipitated monoazo dyestuff of formula

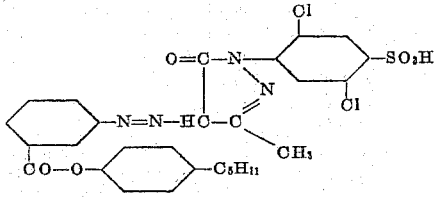

is filtered off and dried. It is a yellow powder which dissolves with yellow coloration in hot water and dyes wool, silk and synthetic polyamide fibers from a neutral to weakly acetic acid bath in pure greenish yellow shades of very good fastness to light, to washing, to perspiration and to fulling.

Example 4

26.9 parts of 1-amino-2-carbo-(4'-tert.butyl)-phenoxybenzene are diazotized after the manner described in Example 1. The resultant clear diazo solution is combined with a solution of 32.3 parts of 1-(2',5'-dichloro)-phenyl-3-methyl-5-pyrazolone-4'-sulfonic acid in 600 parts of water and 35 parts of sodium acetate. Upon completion of the coupling, the precipitated monoazo dyestuff of formula

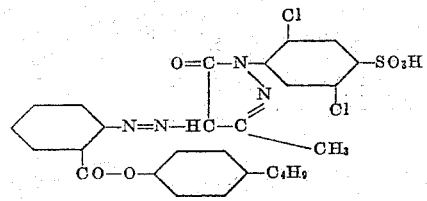

is brought into filterable form by the addition of solid sodium chloride to the coupling mass, after which the dyestuff is filtered off and dried. It is a yellow powder which dissolves with yellow coloration in hot water and dyes wool, silk and synthetic polyamide fibers from neutral or weakly acetic acid bath in pure greenish yellow shades of very good fastness to light, to washing, to perspiration and to fulling.

Example 5

29.5 parts of 1-amino-3-carbo-(4'-cyclohexyl)-phenoxybenzene are diazotized after the manner set forth in Example 1. The resultant clear diazo solution is run into a solution of 25.4 parts of 1-(2'-methyl)-phenyl-3-methyl-5-pyrazolone-5'-sulfonic acid in 600 parts of water and 35 parts of sodium acetate. Upon completion of the coupling, the obtained monoazo dyestuff of formula

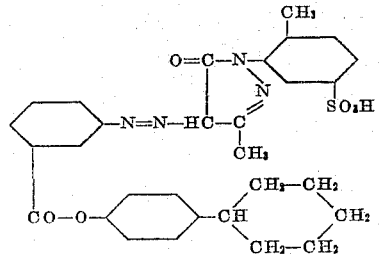

is filtered off and dried. It is a yellow powder which dissolves with yellow coloration in hot water and dyes wool, silk and synthetic polyamide fibers from a neutral or weakly acetic acid bath in pure greenish yellow shades of very good fastness to light, to washing, to perspiration and to fulling.

Dyestuffs with similar properties are set forth in the following table. These dyestuffs are prepared after the manner set forth in the preceding examples. Column A of the table lists the 1-aminobenzene-2- or -3-carboxylic acid ester which is employed in preparing the diazo compound, while column B lists the corresponding azo components, and column C lists the shade of the dyeings obtained with the resultant new monoazo dyestuffs.

TABLE

| Example No. | (A) | (B) | (C) |
|---|---|---|---|
| 6 | 1-amino-3-carbo-(4'-normal octyl)-phenoxybenzene. | 1-(2'-methoxy)-phenyl-3-methyl-5-pyrazolone-5'-sulfonic acid. | greenish yellow. |
| 7 | 1-amino-3-carbo-(4'-tert. butyl)-phenoxy-4-chlorobenzene. | 1-(2'-methylsulfonyl)-phenyl-3-methyl-5-pyrazolone-5'-sulfonic acid. | yellow. |
| 8 | 1-amino-3-carbo-(4'-tert. butyl)-phenoxybenzene. | 1-naphthyl(2')-3-methyl-5-pyrazolone-8'-sulfonic acid. | greenish yellow. |
| 9 | 1-amino-3-carbo-(4'-normal dodecyl)-phenoxybenzene. | 1-phenyl-3-methyl-5-pyrazolone-4'-sulfonic acid. | Do. |
| 10 | 1-amino-3-carbo-(2'-phenyl)-phenoxybenzene. | 1-(4'-chloro)-phenyl-3-methyl-5-pyrazolone-3'-sulfonic acid. | Do. |
| 11 | 1-amino-3-carbo-(4'-phenyl)-phenoxybenzene. | 1-(2'-methyl-5'-chloro)-phenyl-3-methyl-5-pyrazolone-4'-sulfonic acid. | Do. |
| 12 | 1-amino-3-carbo-(4'-normal hexyl)-phenoxybenzene. | 1-(2'-ethoxy)-phenyl-3-methyl-5-pyrazolone-5'-sulfonic acid. | Do. |
| 13 | 1-amino-3-carbo-(4'-benzyl)-phenoxybenzene. | 1-(2',5'-dichloro)-phenyl-3-methyl-5-pyrazolone-4'-sulfonic acid. | Do. |
| 14 | 1-amino-2-carbo-(4'-tert. butyl)-phenoxy-benzene. | 1-naphthyl(1')-3-methyl-5-pyrazolone-6'-sulfonic acid. | Do. |
| 15 | do | 1-(2'-chloro)-phenyl-3-methyl-5-pyrazolone-5'-sulfonic acid. | Do. |
| 16 | 1-amino-2-carbo-(4'-normal octyl)-phenoxybenzene. | 1-(2'-methyl)-phenyl-3-methyl-5-pyrazolone-5'-sulfonic acid. | Do. |
| 17 | 1-amino-2-carbo-(4'-cyclohexyl)-phenoxybenzene. | 1-(2'-methylsulfonyl)-phenyl-3-methyl-5-pyrazolone-5'-sulfonic acid. | yellow. |

Example 18

1 part of a dyestuff obtained according to any one of Examples 1 to 17, 10 parts of sodium sulfate and 2 parts of acetic acid are dissolved in 8000 parts of water. 100 parts of wool are introduced into the solution at 40–50°, and the whole then boiled for 30 minutes. The dye bath is then cooled to 70° and, after the addition of 2 parts of formic acid, again boiled for 30 minutes. The wool, which is thus dyed in a fast shade, is rinsed and dried.

A similar result is obtained if the 2 parts of formic acid are replaced by 3 parts of acetic acid.

Nylon and silk are dyed in like manner, although in the case of silk the boiling is omitted and the bath heated to 90–95°.

Having thus disclosed the invention, what is claimed is:
1. An acid monoazo dyestuff which corresponds to the formula

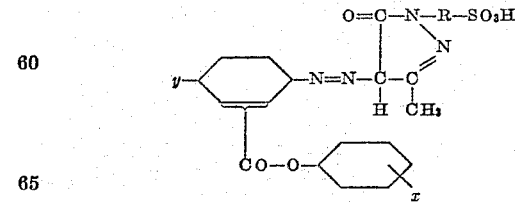

wherein $x$ stands for a member selected from the group consisting of alkyl with 4 to 12 carbon atoms, cyclohexyl, benzyl and phenyl, $y$ stands for a member selected from the group consisting of hydrogen and chlorine, and —R—SO₃H stands for a member selected from the group consisting of aromatic sulfonic acid radicals of the benzene and naphthalene series, the —SO₃H group standing in a position other than in ortho-position to the pyrazolone linkage.

2. The acid monoazo dyestuff which corresponds to the formula

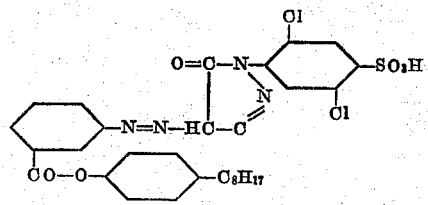

3. The acid monoazo dyestuff which corresponds to the formula

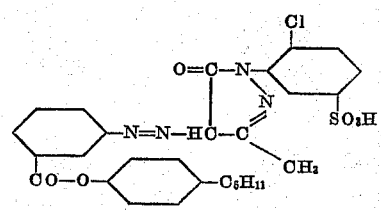

4. The acid monoazo dyestuff which corresponds to the formula

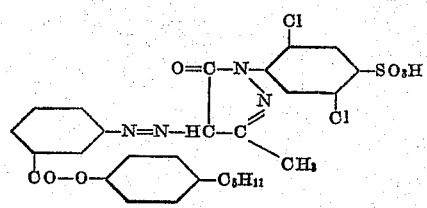

5. The acid monoazo dyestuff which corresponds to the formula

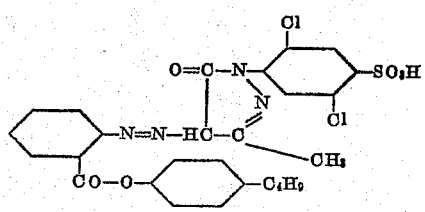

6. The acid monoazo dyestuff which corresponds to the formula

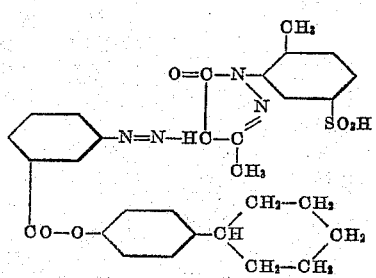

References Cited in the file of this patent
UNITED STATES PATENTS

| | | |
|---|---|---|
| 1,893,553 | Knecht et al. | Jan. 10, 1933 |
| 2,283,326 | Felix et al. | May 19, 1942 |
| 2,512,251 | Kleene | June 20, 1950 |